Figure 8:
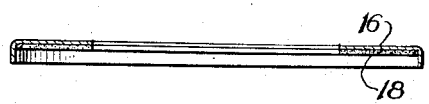

Dec. 22, 1953 R. R. LAYTE 2,663,660
METHOD OF ASSEMBLING FILTER ELEMENTS
Filed May 25, 1951 3 Sheets-Sheet 1
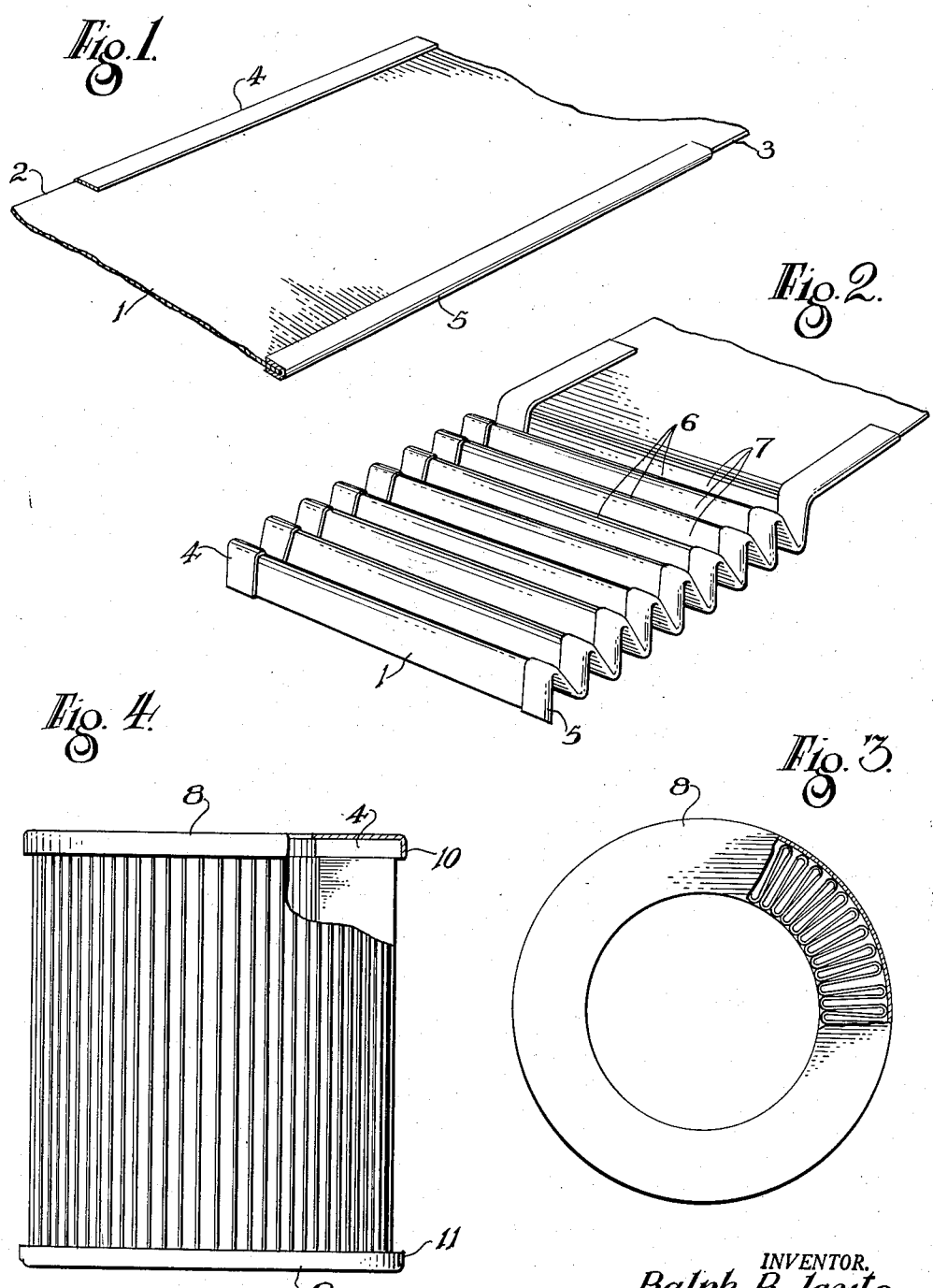
INVENTOR.
Ralph R. Layte.
BY
Kenyon & Kenyon
ATTORNEYS Dec. 22, 1953   R. R. LAYTE   2,663,660
METHOD OF ASSEMBLING FILTER ELEMENTS
Filed May 25, 1951   3 Sheets-Sheet 2
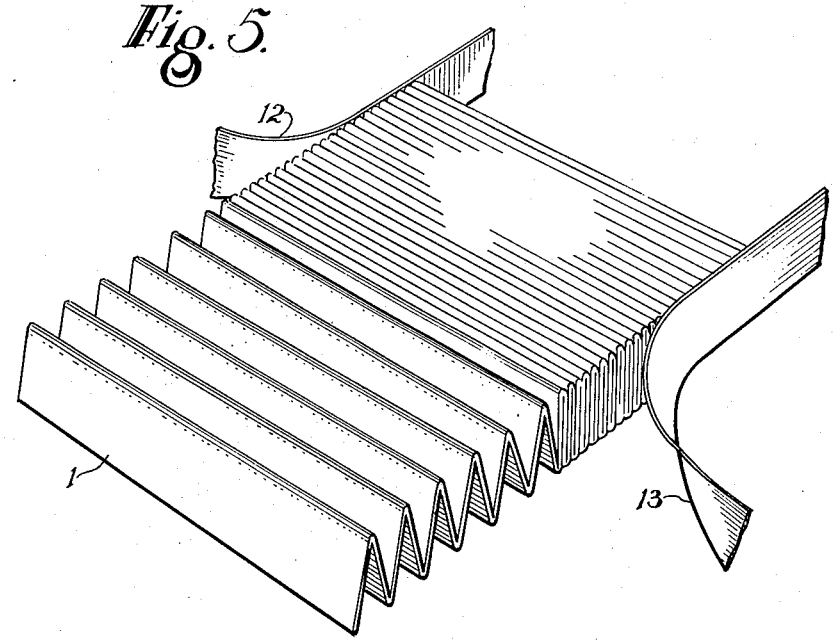
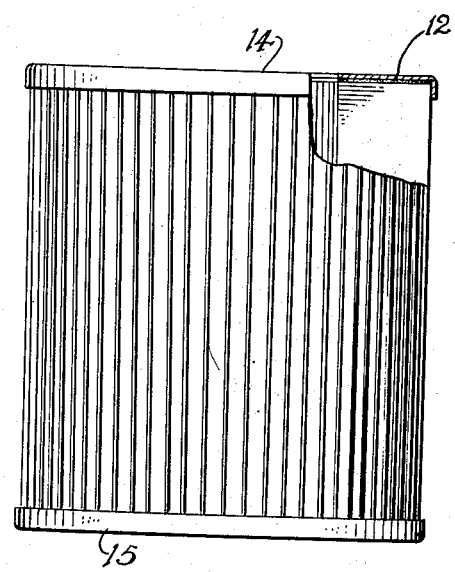
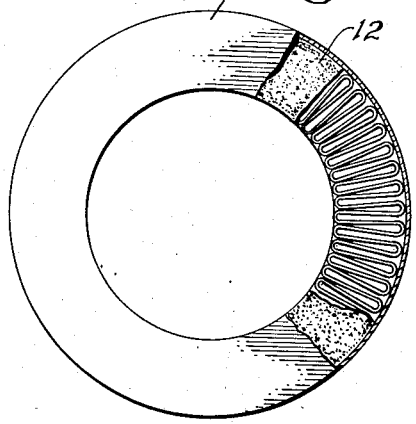
INVENTOR.
Ralph R. Layte
BY
Kenyon & Kenyon
ATTORNEYS Dec. 22, 1953  R. R. LAYTE  2,663,660
METHOD OF ASSEMBLING FILTER ELEMENTS
Filed May 25, 1951  3 Sheets-Sheet 3

INVENTOR.
Ralph R. Layte.
BY
Kenyon & Kenyon
ATTORNEYS

Patented Dec. 22, 1953

2,663,660

UNITED STATES PATENT OFFICE 2,663,660

METHOD OF ASSEMBLING FILTER ELEMENTS

Ralph R. Layte, Westfield, N. J., assignor to Purolator Products, Inc., Rahway, N. J., a corporation of Delaware Application May 25, 1951, Serial No. 228,223

6 Claims. (Cl. 154—81)

The present invention comprises certain hereinafter exemplified methods for assembling filter units or elements, particularly those of the type employed for filtering lubricating oils in connection with the operation of motors such as automotive engines. It has for its general object the provision of a method which will facilitate rapid mass assembly and which will render unnecessary the use of expensive and cumbersome heating and curing steps in current use.

The full nature of the invention will better be understood by reference to the following description of several embodiments thereof which are depicted graphically in the annexed drawings.

Figure 9:
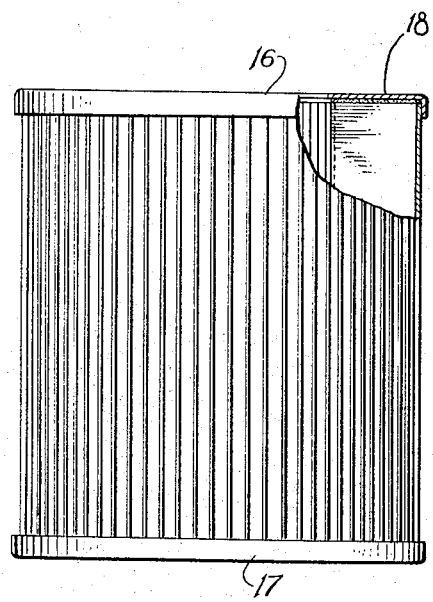
Figure 10:
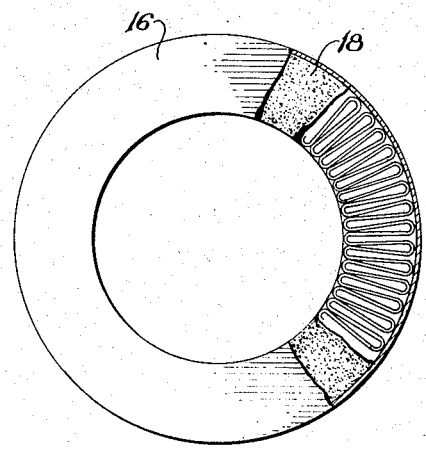

In the drawings:

The Figures 1-4 illustrate successive steps in a method of folding and forming the flat filter paper stock of Figure 1 into the finally assembled and sealed filter unit or element of Figure 4;

The Figures 5-7 illustrate similar steps in an alternative, but likewise inventive, method of folding and sealing similar filter paper into the final filter element of the Figure 7; and The Figures 8 through 10 illustrate still another method, in itself inventive, of assembling the filter element of Figure 10.

Referring now to the Figures 1 through 4, the method of the inventive embodiment there illustrated may begin with an elongated strip 1 of suitable filter paper, the strip, for example, having opposite parallel edges 2 and 3 and being taken from any suitable source such as a roll (not shown). Over these opposite edges there are folded elongated tapes 4 and 5 of adhesive material. That is to say, the tapes 4 and 5 are co-extensive with the edges 2 and 3 and folded so as to have a U-shaped cross section transversely of their length, the edges 2 and 3 fitting into the arms of the U-shaped cross section. The material of the tapes 4 and 5 may be any suitable material which will adhere to the strip 1 and which may be dissolved by suitable solvent materials to accomplish the purposes of assembly hereinafter indicated. Suitable specifically-identified adhesive and solvent materials for these purposes are indicated hereinafter.

Either before or after the tapes 4 and 5 have been applied, as indicated, the strip 1 may be cut transversely of its length at some point which will provide a strip of predetermined length sufficient to form a filter assembly of the kind shown in Figure 4. Before or after the cutting, but after the addition of the tapes 4 and 5, the strip and the tapes are pleated transversely of the length of the strip 1 in a manner which is clearly indicated by the Figure 2. That is to say, at this stage the filter paper will have the general appearance of an accordion-like configuration having alternate hills 6 and valleys 7. After the pleating, as indicated by Figure 2, the pleated configuration is rolled into the form of an annulus having its axis parallel to the line of the pleatings, i. e., parallel to the transverse dimension of the strip 1. The end view of such an annulus is shown partially in the broken section of the Figure 3. The ends of the pleated Figure 2 configuration, which have been brought into juxtaposition by the rolling, are suitably overlapped or sealed together so as to eliminate any gaps in the filtering wall throughout the cylindrical portion of the annulus.

As a final step, in order both to give the filter element of Figure 4 some rigidity and also to seal the ends thereof, the outer portions of the strips 4 and 5 (portions on the outermost ends of the annulus of Figure 3) are moistened by a suitable solvent material for the adhesive material of which the tapes are formed, and thereafter the ends of the annulus are capped by the end discs or end caps 8 and 9. It is understood then that the end caps 8 and 9 will be bonded to the annulus by the adhesive material, the said moistening by use of the solvent material facilitating the process. As indicated by the drawings, these end caps are simply annular members, preferably of heavy cardboard or like material, having inwardly-extending peripheral flanges or edges 10 and 11 which engage and retain the ends of the filter paper annulus.

Referring to the Figures 5 through 7, the inventive embodiments there illustrated begin again with a strip 1 of filter paper similar to that in Figure 1 and which, as a first step, has been pleated transversely to its length, as indicated by the Figure 5. After pleating, tapes of adhesive material substantially the same in character as that of the tapes 4 and 5 in the preceding embodiment are pressed against the parallel opposite edges of the pleated configuration, substantially as indicated by Figure 5. In this case the tapes 12 and 13 are of such character that they will stretch when the pleated configuration of Figure 5 is rolled into an annulus. The configuration of Figure 5 is rolled into an annulus substantially as with the Figures 2, 3 and 4 of the preceding embodiment, the annulus being indicated by the broken portions of the Figure 6. At this stage it is understood then that the annulus is completed and stands with somewhat annular end members of adhesive material affixed to it.

In a manner similar to that of the preceding embodiment, the end tapes 12 and 13, after the rolling into the annulus, are moistened with a suitable solvent and end caps 14 and 15, substantially the same as caps 8 and 9 of the Figure 4, are added to complete the assembly as in Figure 7.

In the inventive embodiment of the Figures 8, 9 and 10, filter paper as in Figure 1 is formed into an annulus with a pleated configuration substantially as in the Figures 4 and 7 except that, up to this stage, no adhesive material or solvent of any kind has been added. To complete the filter element as in Figure 10, end discs 16 and 17 are coated on their inner surfaces (as in Figure 8) with an annulus 18 of adhesive material of the character hereinbefore indicated. Thereafter, a solvent as before indicated is used to moisten the surface and thereupon the end caps are superimposed on the annulus substantially as with the preceding embodiments.

Suitable adhesive materials for the tapes 4, 5, 12, 13 and 18 are indicated by the following list and suitable solvents are suggested opposite each material.

| Adhesive Material | Solvent |
| --- | --- |
| Cellulose Acetate Butyrate | Fatty acid esters, Ketones. |
| Ethyl Cellulose | Do. |
| Methyl Cellulose | Do. |
| Methyl Methacrylate | Chlorinated hydrocarbons, Fatty acid esters, Aromatic Hydrocarbons. |
| Styrene Resin | Fatty acid esters, Aromatic Hydrocarbons, Ketones. |
| Vinyl Alcohol | Alcohols, water. |
| Vinyl Acetate | Alcohols, Chlorinated hydrocarbons, Fatty acid esters, Aromatic hydrocarbons, Ketones. |
| Vinylidene Chloride | Fatty acid esters, Ketones. |
| Vinyl Chloride-Acetate Copolymers. | Do. |
| Vinyl Acetal | Alcohols, Fatty acid esters, Aromatic hydrocarbons. |

What is claimed is:

1. The method of fabricating a filter element which comprises pleating an elongated strip of filter paper transversely to its length, applying adhesive material to the ends of the pleating, rolling the strip into an annulus composed of a single layer of pleated paper and having its axis parallel to the line of pleatings, applying solvent material to the adhesive material on the ends of the annulus, and capping the ends of the pleating with annular caps whereby the caps adhere to the ends of the annulus.

2. The method of fabricating a filter element which comprises pleating an elongated strip of filter paper transversely to its length, applying tapes of adhesive material to the ends of the pleating, rolling the strip into an annulus composed of a single layer of pleated paper and having its axis parallel to the line of pleatings, applying solvent material at least to those portions of the tapes which form part of the ends of the annulus, and capping the ends of the pleatings with annular caps whereby the caps adhere to the ends of the annulus.

3. The method of fabricating a filter element which comprises folding tapes of adhesive material in enveloping relationship over the parallel longitudinal edges of an elongated strip of filter paper, pleating the strip and tapes transversely to the length of the strip, rolling the strip into an annulus composed of a single layer of pleated paper and having its axis parallel to the line of the pleatings, applying solvent material at least to the outer tape edges on the ends of the annulus, and capping the ends of the pleatings with annular caps whereby the caps adhere to the ends of the annulus.

4. The method of fabricating a filter element which comprises folding elongated tapes of adhesive material along their longitudinal dimensions and in enveloping relationship over substantially the entire parallel longitudinal edges of an elongated strip of filter paper, pleating the strip and tapes transversely to the length of the strip, rolling the strip into an annulus composed of a single layer of pleated paper and having its axis parallel to the line of the pleatings, applying solvent material at least to the outer tape edges on the ends of the annulus, and capping the ends of the pleatings with annular caps whereby the caps adhere to the ends of the annulus.

5. The method of fabricating a filter element which comprises pleating an elongated strip of filter paper transversely to its length, thereafter laying flat tapes of adhesive material along the ends of the pleated configuration defined by the ends of the pleatings, rolling the pleated strip into an annulus composed of a single layer of pleated paper and having its axis parallel to the line of pleatings, applying solvent material to the faces of the tapes which form the end faces of the annulus, and capping the ends of the pleatings with annular caps whereby the caps adhere to the ends of the annulus.

6. The method of fabricating a filter element which comprises pleating an elongated strip of filter paper transversely to its length, rolling the strip into an annulus composed of a single layer of pleated paper and having its axis parallel to the line of pleatings, applying adhesive material to the inside of annular end caps, applying solvent material to the adhesive material, and capping the ends of the pleatings with the annular caps whereby the caps adhere to the ends of the annulus.

RALPH R. LAYTE.

References Cited in the file of this patent

UNITED STATES PATENTS

| Number | Name | Date |
| --- | --- | --- |
| 2,190,683 | Schaaf et al. | Feb. 20, 1940 |
| 2,190,886 | Schaaf et al. | Feb. 20, 1940 |
| 2,221,006 | Romanoff | Nov. 12, 1940 |
| 2,222,815 | Johnson | Nov. 26, 1940 |
| 2,468,862 | Briggs | May 3, 1949 |
| 2,502,772 | Winstead | Apr. 4, 1950 |
| 2,512,797 | Harvuot | June 27, 1950 |
| 2,569,745 | Cook | Oct. 2, 1951 |
| 2,592,104 | Arakelian | Apr. 8, 1952 |